US010249059B2

(12) United States Patent
Charikar et al.

(10) Patent No.: US 10,249,059 B2
(45) Date of Patent: *Apr. 2, 2019

(54) LOSSLESS COMPRESSION OF FRAGMENTED IMAGE DATA

(71) Applicant: EMC IP Holding Company LLC, Hopkinton, MA (US)

(72) Inventors: Moses Charikar, Princeton, NJ (US); Deepa Ramakrishna, Princeton, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/385,725

(22) Filed: Dec. 20, 2016

(65) Prior Publication Data

US 2017/0104999 A1 Apr. 13, 2017

Related U.S. Application Data

(63) Continuation of application No. 13/931,985, filed on Jun. 30, 2013, now Pat. No. 9,558,566.

(Continued)

(51) Int. Cl.
| G06K 9/36 | (2006.01) |
| G06K 9/46 | (2006.01) |
| G06T 9/00 | (2006.01) |
| H04N 19/13 | (2014.01) |
| H04N 19/146 | (2014.01) |
| H04N 19/182 | (2014.01) |
| H04N 19/88 | (2014.01) |
| H04N 19/60 | (2014.01) |

(52) U.S. Cl.
CPC ............... *G06T 9/00* (2013.01); *G06T 9/005* (2013.01); *H04N 19/13* (2014.11); *H04N 19/146* (2014.11); *H04N 19/182* (2014.11); *H04N 19/60* (2014.11); *H04N 19/88* (2014.11)

(58) Field of Classification Search
CPC ......... G06T 9/00; G06T 9/005; H04N 19/182; H04N 19/146; H04N 19/88; H04N 19/13
See application file for complete search history.

(56) References Cited

U.S. PATENT DOCUMENTS

| 6,744,929 B1 * | 6/2004 | Okada ................... H04N 19/60 375/E7.088 |
| 9,558,566 B2 * | 1/2017 | Charikar .................. G06T 9/00 |

(Continued)

FOREIGN PATENT DOCUMENTS

| CN | 1805547 A | 7/2006 |
| CN | 101371447 A | 2/2008 |

(Continued)

*Primary Examiner* — Samir A Ahmed
(74) *Attorney, Agent, or Firm* — Van Pelt, Yi & James LLP (57) ABSTRACT

Lossless compression of fragmented image data is disclosed. In some embodiments, a stream of information is received, wherein the stream of information comprises a sequence of tuples and wherein each of the tuples comprises data elements corresponding to one of a plurality of input channels. A channel transformer is employed to rearrange the data elements into a plurality of output channels for an output stream wherein the output channels have higher compressibility than the input channels. The compressed output stream is stored.

22 Claims, 11 Drawing Sheets

Related U.S. Application Data (60) Provisional application No. 61/691,735, filed on Aug. 21, 2012.

(56) References Cited

U.S. PATENT DOCUMENTS

| | | | |
|---|---|---|---|
| 9,684,974 B2 | 6/2017 | Charikar | |
| 2009/0226084 A1* | 9/2009 | Courchesne | H04N 19/593 382/166 |
| 2013/0127637 A1* | 5/2013 | Seroussi | H04W 52/0251 340/870.39 |

FOREIGN PATENT DOCUMENTS

| | | |
|---|---|---|
| CN | 101160725 A | 4/2008 |
| CN | 102708868 A | 10/2012 |
| CN | 104718706 A | 6/2015 |

* cited by examiner

Level = $2^2$     Value = 3

$7 = 2^2 + 3$ $t_4 = 2^3$

Level = $2^3$     Value = 5

LOSSLESS COMPRESSION OF FRAGMENTED IMAGE DATA

CROSS REFERENCE TO OTHER APPLICATIONS

This application is a continuation of co-pending U.S. patent application Ser. No. 13/931,985, entitled LOSSLESS COMPRESSION OF FRAGMENTED IMAGE DATA filed Jun. 30, 2013 which is incorporated herein by reference for all purposes, which claims priority to U.S. Provisional Application No. 61/691,735, entitled LOSSLESS COMPRESSION OF FRAGMENTED INTEGER IMAGE DATA filed Aug. 21, 2012 which is incorporated herein by reference for all purposes.

BACKGROUND OF THE INVENTION

Computing, storage, and communications media must handle greater and greater volumes of digital data. The increase in data volume has led to a tremendous demand for high-speed transmission, high capacity and high throughput storage, and data archiving. In order to accommodate this data growth, efficient compression techniques have become increasingly important.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Techniques for lossless compression of a sequence of integer values are described herein. In some embodiments, a sequence of integer values may represent a fragment of an arbitrary image or sensor data.

Image data has become a dominant data type, and it is among the fastest growing segments of data generated by various sources in the digital information world. Although lossy compression techniques such as JPEG have many use cases, they cannot satisfy the requirements of several important applications including medical imagery (such as CT scan images, MM images and such) and high definition film images. These applications require their images to be compressed and stored in a lossless manner, meaning that the compressed version can be decompressed to restore the original image in its entirety without any data loss.

When data transmission and data storage systems employ compression methods to reduce network bandwidth and data storage footprint, they often require data to be divided into fragments. For example, a data transfer protocol often requires a data stream to be split into fragments in order to transfer a packet of data at a time. A de-duplication file system often requires data to be stored in relatively small units such as fixed-size blocks or variable-size segments.

Since an image can be quite large, it is highly desirable to have a lossless compression method that can compress small fragments of an image quickly and achieve high compression ratios and simpler hardware compression implementation. Furthermore, fragments can be independently compressed and decompressed using either or both multiple computing elements (or cores) or multiple software elements (or threads).

Figure 1:
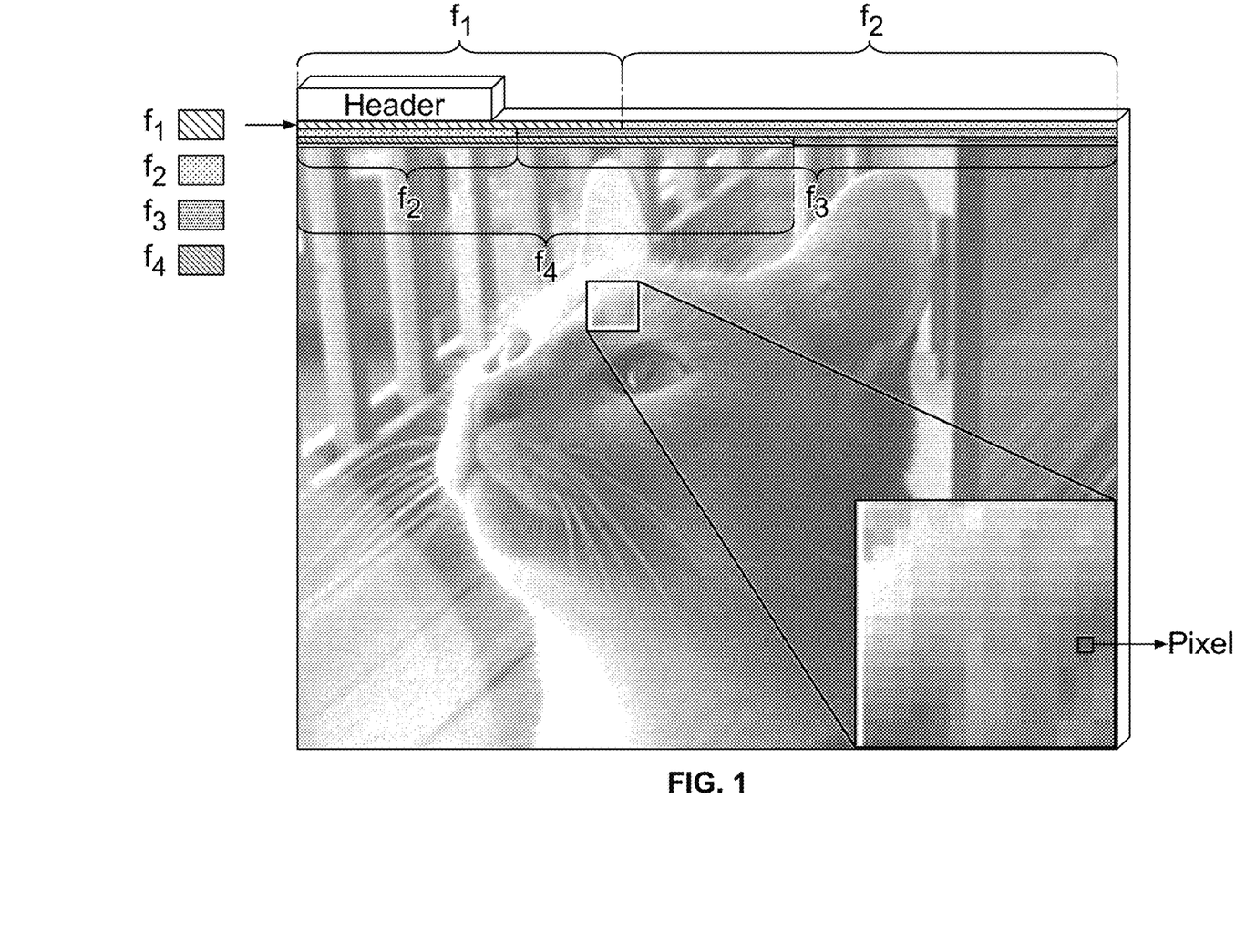
FIG. 1 illustrates an embodiment of how a two-dimensional image is split into multiple one-dimensional fragments.
Figure 2:
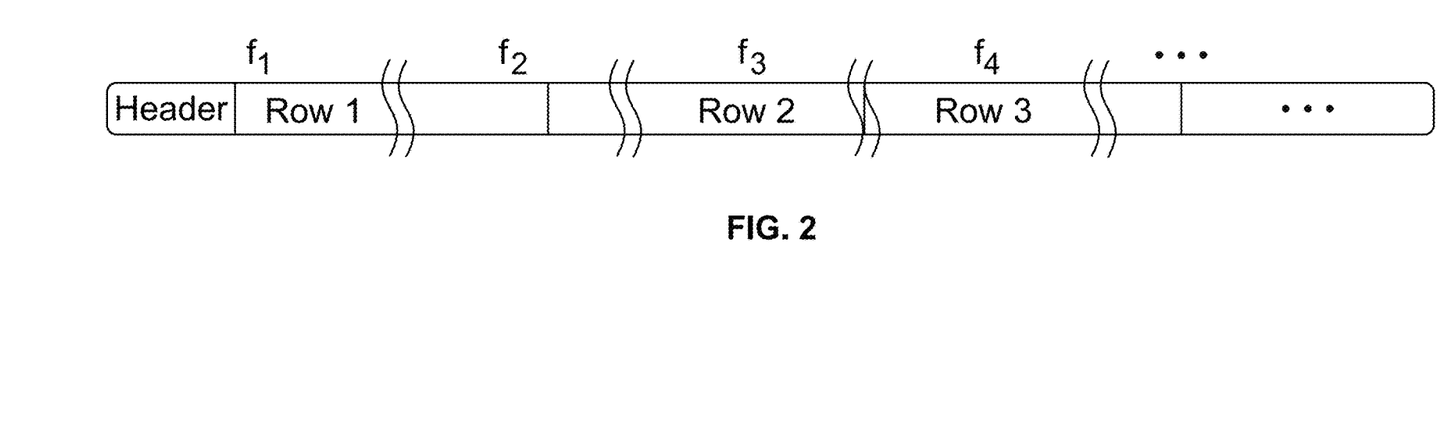
FIG. 2 illustrates an embodiment of how an image is laid out on disk and illustrates fragments and fragment boundaries.

FIG. 1 illustrates an embodiment of how a two-dimensional image is split into multiple one-dimensional fragments $f_i$. Each fragment may include a portion of one or more rows. FIG. 2 illustrates an embodiment of how an image is laid out on disk and illustrates fragments and fragment boundaries.

The lossless compression techniques disclosed herein may be used to compress each fragment efficiently in a lossless manner and may also be used to expand the compressed fragments without reference to other fragments or metadata.

Compression Algorithm

Overview

In various embodiments, the input to the compression algorithm is a sequence of k-tuples of integer values, originating from a fragment of image or sensor data. The sequence of values comprising the $i^{th}$ coordinate of every tuple is referred to as a channel; there may be k such channels. For example, in the case of image data, each tuple may be associated with a single pixel. Each channel here is a color component (e.g., red, green, and blue), with the coordinates of one tuple representing the color information at a pixel. In various embodiments, the compression algorithm described herein may be used to encode the input losslessly by exploiting continuity properties within and across channels. In some embodiments, exploiting continuity properties is performed by at least performing transformations to eliminate redundancies within and across channels and losslessly encoding the resulting sequence based on statistics of the data. In some embodiments, a flexible encoding scheme that can adapt to the properties of the data but at the same time requires very little space to represent the properties of the data it depends on is used.

Figure 3:
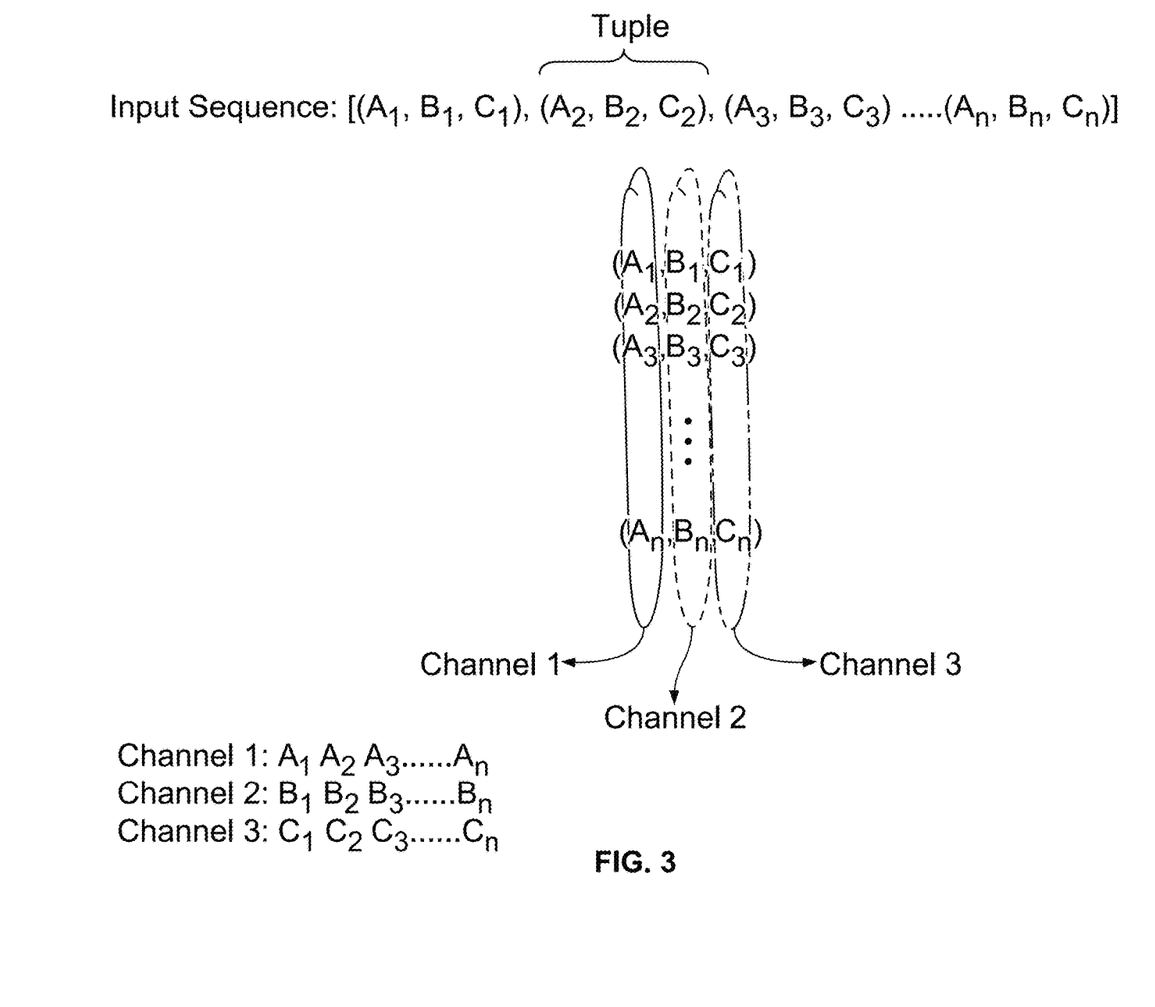
FIG. 3 illustrates an embodiment of an input sequence comprising tuples and showing channels comprising certain coordinates within the tuples.

FIG. 3 illustrates an embodiment of an input sequence comprising tuples and showing channels comprising certain coordinates within the tuples. For example, for the first tuple of the sequence, each of $A_1$, $B_1$, and $C_1$ corresponds to a channel and is each represented as an integer value. For example, integer values of channel 1 ($A_1, A_2, \ldots, A_n$) may be associated with the red color component, integer values of channel 2 ($B_1, B_2, \ldots, B_n$) may be associated with the green color component, and integer values of channel 3 ($C_1, C_2, \ldots, C_n$) may be associated with the blue color component.

Data Transformation

In some embodiments, several transformations are performed as preprocessing prior to the performance of compression. In general, the goal of these transformations is to exploit the redundancies and continuity properties of the numeric values and convert them into smaller values that can be compressed more effectively. In various embodiments, the transformations are reversible, so that the original sequence of values may be obtained from the transformed sequence.

Point-wise Channel Transformation

In some embodiments, in point-wise channel transformations, redundancies across channels are eliminated by applying a reversible transformation to the channel values for a single pixel, where this transformation is applied for every pixel independently. In order to facilitate compression, optionally, the channels produced into a new set of channels may be transformed by means of a reversible transformation such that the new set of channels is better compressible than the original set. Examples of transforms that may be used include (reversible) linear transformations as well as bit regrouping operations. As an example of the latter, the MSBs (most significant bytes) of a few channels can be grouped together to produce a new channel to enable more efficient encoding.

Figure 4:
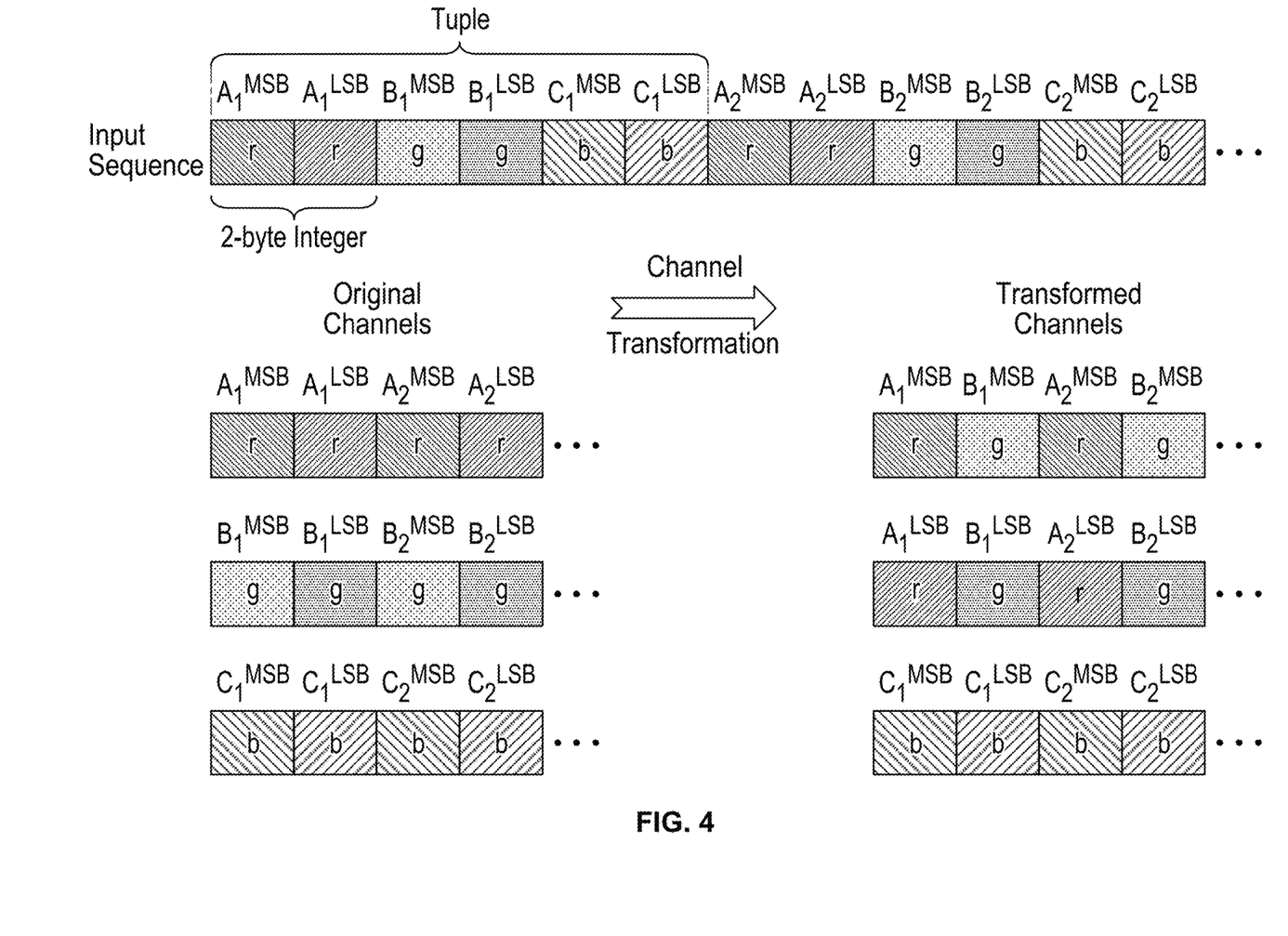
FIG. 4 illustrates an embodiment of channel transformation.

FIG. 4 illustrates an embodiment of channel transformation. As shown in the given example, each integer comprises two bytes where one byte is the most significant byte while the other is the least significant byte. Each original channel may comprise integers associated with the same color component. As shown in the example, the top original channel includes two byte integers associated with red, the middle original channel includes two byte integers associated with green, and the bottom original channel includes two byte integers associated with blue. The original channels may be transformed such that the top transformed channel comprises a series of most significant bytes from the original red channel and the original green channel, the middle transformed channel comprises a series of least significant bytes from the original red channel and the original green channel, while the bottom transformed channel remains the same as the original blue channel (with its alternating most significant bytes and least significant bytes).

In some embodiments, potential channel transforms are evaluated by estimating the compressibility of the new channels they produce. In order to evaluate the potential channel transforms, a suitable function e(x) that estimates the number of bits required to encode a numeric value x is selected. For example, $e(x)=1+\log_2(|x|)$ may be used as an estimate of the number of bits needed to encode x.

Spatial Data Transformation

In some embodiments, in spatial data transformations, redundancies are eliminated and continuity within a channel is exploited by applying a reversible transformation to the values of a particular channel for consecutive pixels.

Let A be a particular (transformed or not transformed) channel (i.e., sequence of numeric values) in a particular fragment that is desired to be compressed. Then $A_i$ represents the $i^{th}$ element of channel A.

Let X represent the sequence obtained after the transformation. The following transformations could be used.

Differential transform: here every element is subtracted from the element preceding it. Thus, $X_i = A_i - A_{(i-1)}$ for $i > 1$ $X_i = A_i$ for $i = 1$ XOR transform: here an XOR is taken of every element and the one preceding it. Thus, $X_i = A_i \mathbin{x} \text{or} A_{(i-1)}$ for $i > 1$ $X_i = A_i$ for $i = 1$ In some embodiments, additional transformations may be considered, such as applying the differential transform twice and other such variations.

Mapping the Sequence of Transformed Values into (Level, Value) Pairs

Having applied various transformations, compressing the sequence of values in each transformed channel is performed next. In some embodiments, the sequence of values (for a single transformed channel) is referred to as the "input sequence." In order to compress the input sequence, a variable length code that is adapted to the statistics of the values to be represented is used. Then, in various embodiments, the encoding of the sequence will comprise a suitable representation of the statistics (from which the variable length code can be reconstructed by the decoder) followed by an encoding of the values themselves. However, since the space of possible values is very large, the statistics that are chosen to be used in designing the variable length codes should be selected such that representation of the statistics itself does not take up a lot of space. In order to do this, in some embodiments, the algorithm uses a quantization method to group numeric values. Each numeric value is specified by two components: level and value bits. In some embodiments, the level specifies the high order bits and the value specifies the low order bits. Later, in some embodiments, the algorithm computes the frequencies of levels in the sequence and this is used to design a variable length code for encoding levels. In some embodiments, the value bits are represented verbatim without encoding.

Figure 5:
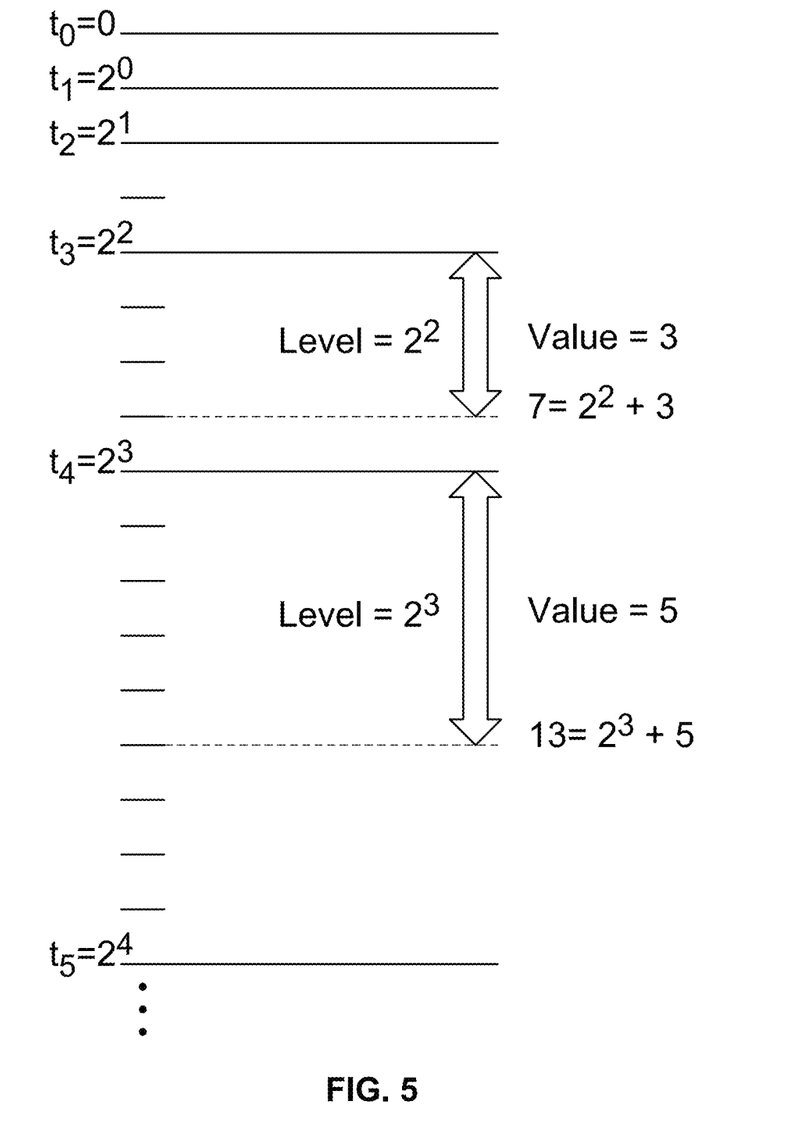
FIG. 5 illustrates an embodiment of mapping pixel values into the (level, value) form.

FIG. 5 illustrates an embodiment of mapping pixel values into the (level, value) form. In the given example, the levels are $2^i$, and the computations of level and value for 7 and 13 are illustrated.

In some embodiments, the scheme is implemented in the following way to allow for flexibility in partitioning values into level and value components and the ability to adapt to the characteristics of different data sources.

Picking the Sequence of Thresholds

In some embodiments, a sequence of thresholds is selected: $0=t_0<t_1<t_2<t_3<\ldots t_i<t_{i+1}<\ldots$, and the non-negative integers are partitioned into a collection of disjoint intervals: $[t_0, t_1), [t_1,t_2), [t_2,t_3),t_i,t_{i+1})\ldots$. In various embodiments, the level component specifies which interval $[t_i,t_{i+1})$ a value lies in, and the value component specifies a particular integer in the interval. A special case of this is when the thresholds are chosen such that for all i, $(t_{i+1}-t_i)$ is a power of 2. In this case, a numeric value v is encoded by indicating the interval $[t_i, t_{i+1})$ that v lies in (specified by the level) and further indicating the difference $v-t_i$. More specifically, in order to specify non-negative value v, the unique i, such that $t_i \le v < t_{i+1}$, is to be found. v is said to be at level i. Now suppose $t_{i+1}-t_i=2^b$. Then the value bits for v are obtained by representing $v-t_i$ as a b bit integer. Note that $v-t_i$ is an integer in the range $[0, 2^b-1]$. A further special case of this scheme is when consecutive thresholds are of the form $t_i, t_{i+1})$ and $t_{i+1}=(k+1)2^b$. In this case, the value bits for numbers in the interval $[t_i, t_{i+1})$ are simply the b least significant bits. Note that in this special case, it is not necessarily the case that the same value of b applies to all consecutive thresholds. Take the following example: $t_0=0$, $t_1=1$, $t_2=2$, $t_3=3$, $t_4=4$, $t_5=6$, $t_6=8$, $t_7=12\ldots$. Consider consecutive thresholds $t_3,t_4$: $t_3=3. 2^0$, $t_4=4. 2^0$; here $b=0$. Consider consecutive thresholds $t_4,t_5$: $t_4=2. 2^1$, $t_5=3. 2^1$; here $b=1$. Consider consecutive thresholds $t_5,t_6$: $t_5=3. 2^1$, $t_6=4. 2^1$; here $b=1$. Consider consecutive thresholds $t_6,t_7$: $t_6=2. 2^2$, $t_7=3. 2^2$; here $b=2$.

The sequence of thresholds: $0=t_0<t_1<t_2t_3<\ldots t_i<t_{i+1}<\ldots$ is adapted to the data. We could either determine these thresholds for image or sensor data of a particular kind and apply this predetermined sequence for all data of this kind (data type adaptive), or we could determine a sequence of thresholds adaptively for each image fragment we have to compress (data instance adaptive). In the former case, a threshold determination algorithm is applied on sample data to obtain a fixed sequence which is used for all data of that kind. In the latter case, the threshold determination algorithm is applied to each fragment separately to produce thresholds for use in encoding that particular fragment. Here, the sequence of thresholds picked for each fragment must also be represented along with the encoding of the fragment.

In some embodiments, the threshold determination algorithm selects thresholds such that (i) the observed distribution of values in each interval $[t_i,t_{i+1})$ is roughly uniform, and (ii) the total observed frequency of values in each interval $[t_i, t_{i+1})$ is at least some specified minimum. The latter property ensures that the number of thresholds selected is relatively small, which in turn controls the encoding cost. Note that it may not be possible to achieve both these objectives simultaneously, so some relaxation may be used.

Figure 6:
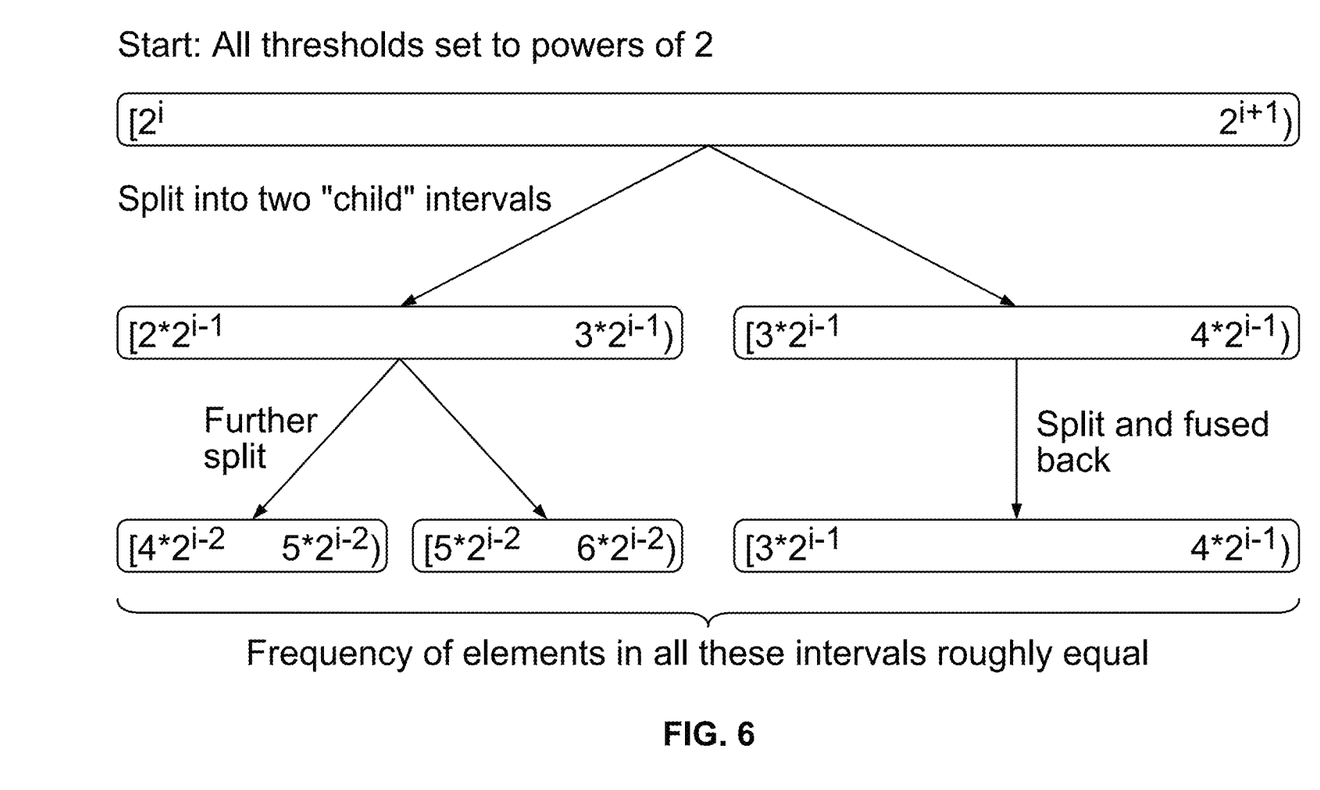
FIG. 6 illustrates an embodiment of a threshold selection algorithm.

FIG. 6 illustrates an embodiment of a threshold selection algorithm. This algorithm additionally ensures that consecutive thresholds are of the form $t_i=k.2^b$ and $t_{i+1}=(k+1)2^b$. Inputs into the threshold selection algorithm include the sequence of numeric values, depth d, and frequency threshold $f_t$. The algorithm starts with all thresholds being set to powers of 2. Next, consider the interval $[2^i,2^{i+1})$. Each such interval is split into two "child" intervals of equal length (also powers of 2) which corresponds to adding a new threshold in the middle of the thresholds $2^i,2^{i+1}$. The new intervals produced would be $[2*2^{i-1},3*2^{i-1})$ and $[3*2^{i-1}, 4*2^{i-1})$. These intervals are further split into two children intervals each. The number of times such splitting is carried out is dictated by the depth d (an input to the algorithm) or until intervals of length 1 are obtained. Typically the depth is set to 3 or 4. Note that if the depth is too high, the intervals get smaller and smaller, and the number of numeric values in the input sequence that will fall into each interval will get progressively smaller. Next, analyze a sample of the sequence of numeric values and count the number of values that fall into each interval, yielding a frequency distribution over intervals. In some cases it is desired that the frequency of each interval is roughly the same and furthermore that the distribution of elements within each interval is roughly uniform. Since the frequency distribution for all the smaller intervals is calculated, the frequency for all the larger intervals (from which the smaller intervals were created) can be easily calculated by simply summing the frequencies. It may be desirable to eliminate intervals that have very low frequencies because it is inefficient. If the frequency of a given interval is below a certain threshold $f_t$ (another input to the algorithm), then the interval is merged with its sibling interval, so that the resulting interval is their parent. In the example of FIG. 6, we start with interval $[2^i,2^{i+1})$. This parent interval is split into two children. The first child ends up being split again, but the second child is split and merged back so that the frequencies of all the intervals shown at the end are roughly the same.

The (unsigned) elements of the input sequence are converted into levels using the thresholds determined by the algorithm above. Henceforth, the described encoding scheme specifies the encoding for the levels. The value bits are transmitted separately (usually without encoding).

Basic Algorithm for Sequence Compression

Figure 7:
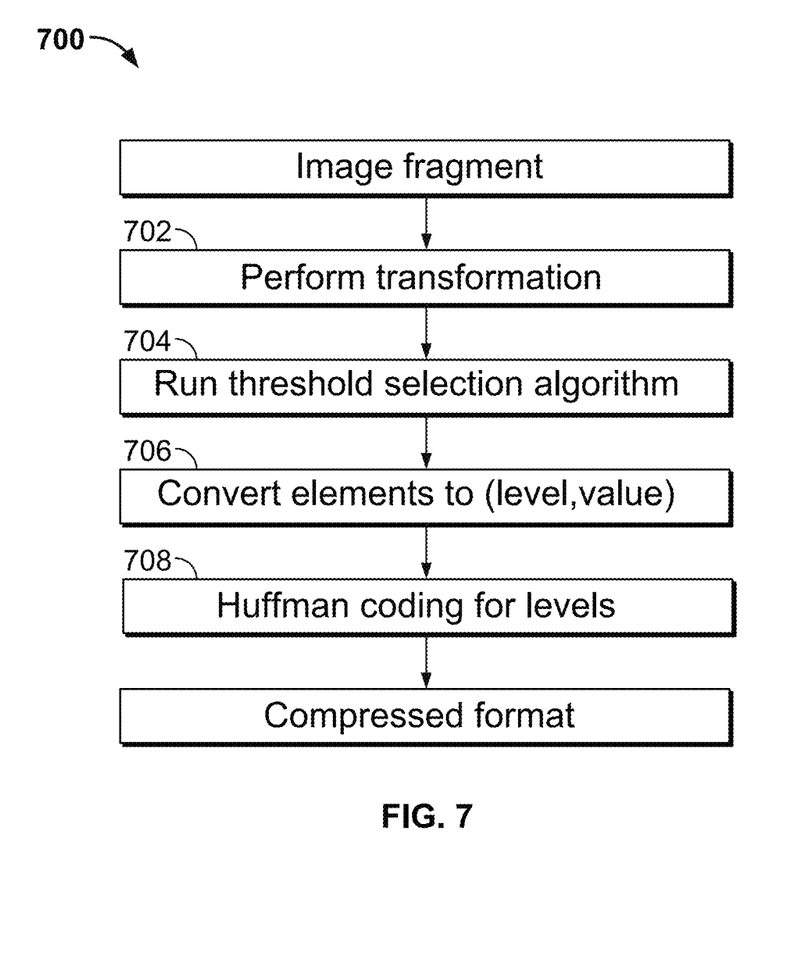
FIG. 7 illustrates an embodiment of a compression process.

FIG. 7 illustrates an embodiment of a compression process 700. Let X be a sequence of values corresponding to a transformed channel (obtained by the data transformation steps, e.g., at 702) in a particular fragment. The threshold selection algorithm is executed at 704 to choose the thresholds for the compression algorithm. The absolute values of the entries in X are converted into levels at 706 as described above, to produce the sequence $X_L$. The signs of the entries in the transformed array will be transmitted separately. The encoding of $X_L$ is performed using Huffman codes at 708.

Figure 8:
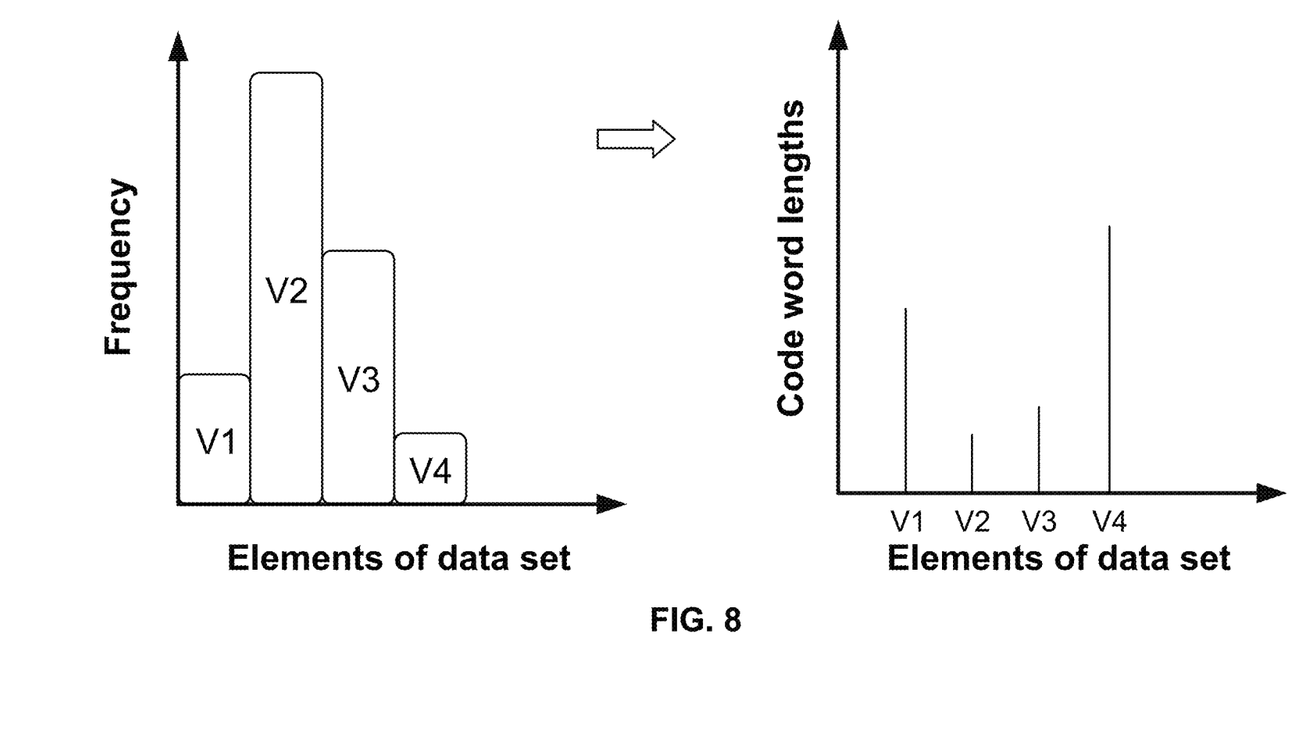
FIG. 8 illustrates an embodiment of a $1^{st}$ order Huffman code.

There are multiple possibilities for the creation of the Huffman codes. One example technique is to have a $1^{st}$ order code which is the optimal Huffman code over levels using frequencies of levels in this particular sequence. FIG. 8 illustrates an embodiment of a $1^{st}$ order Huffman code.

Figure 9:
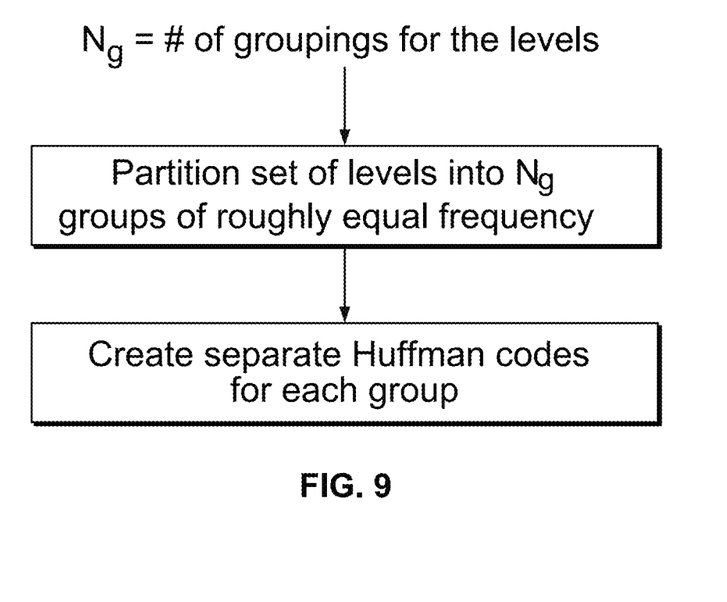
FIG. 9 illustrates an embodiment of a process of performing a $2^{nd}$ order Huffman code.

Another method is to create a $2^{nd}$ order Huffman code, which consists of a code wherein each level is represented using information about the previous level in the sequence. This must be done carefully to ensure that the space required to represent the additional statistics (required for the decoder to reconstruct the $2^{nd}$ order Huffman codes) do not swamp the space benefit achieved by using such codes. To achieve a smooth tradeoff between the representation space overhead and the encoding size of the improved codes (and facilitate finding a sweet spot for this tradeoff), in some embodiments, the set of levels is divided into a small number of groups and separate Huffman codes are created for each of these groups. Grouping of levels is done such that the total frequency of elements in each group is roughly equal. FIG. 9 illustrates an embodiment of a process of performing a $2^{nd}$ order Huffman code. The sweet spot for the aforementioned tradeoff is found by computing the total encoding cost (including representation space overhead) for several different choices for the number of groups. In some embodiments, the optimal value for the number of groups may either be determined based on the specific sequence of values to be encoded or may be determined based on a representative sample of the input.

Encoding Sequence of Levels

The encoded bits required to transmit the level information for the transformed sequence is determined based on the Huffman codes.

Encoding Sequence of Values

Once the levels have been encoded, in some embodiments, the value bits themselves are transmitted verbatim. In other words, no additional encoding is done for these bits, and they are transmitted directly (since it is reasonable to assume that these low order bits are random).

Encoding the Bits to Represent the Signs

The signs of the elements might have to be transmitted depending upon the choice of transformation. In some embodiments, the signs can either be transmitted by combining them with the levels (in which case, if A is a possible level, then –A would also be a possible level) or transmitting them separately using one bit per non-zero sign element.

Applications

The following are examples of applications for the disclosed compression techniques. However, nothing in this section should be interpreted as a limitation on the embodiments described above.

Storage Systems

Storage systems can reduce their storage footprint by compressing their data segments or blocks. For example, a file system typically stores each file with multiple data segments or data blocks on a storage media in order to ease storage allocations and reclamations to reduce storage fragmentations. In order to store more data on the same physical storage capacity, some file systems compress data segments before storing them on storage media. A lossless compression algorithm such as GZIP or LZ may be applied on the data segments before storing them to storage media and a corresponding decompression algorithm is applied after the data segments are retrieved from the storage media.

Figure 10:
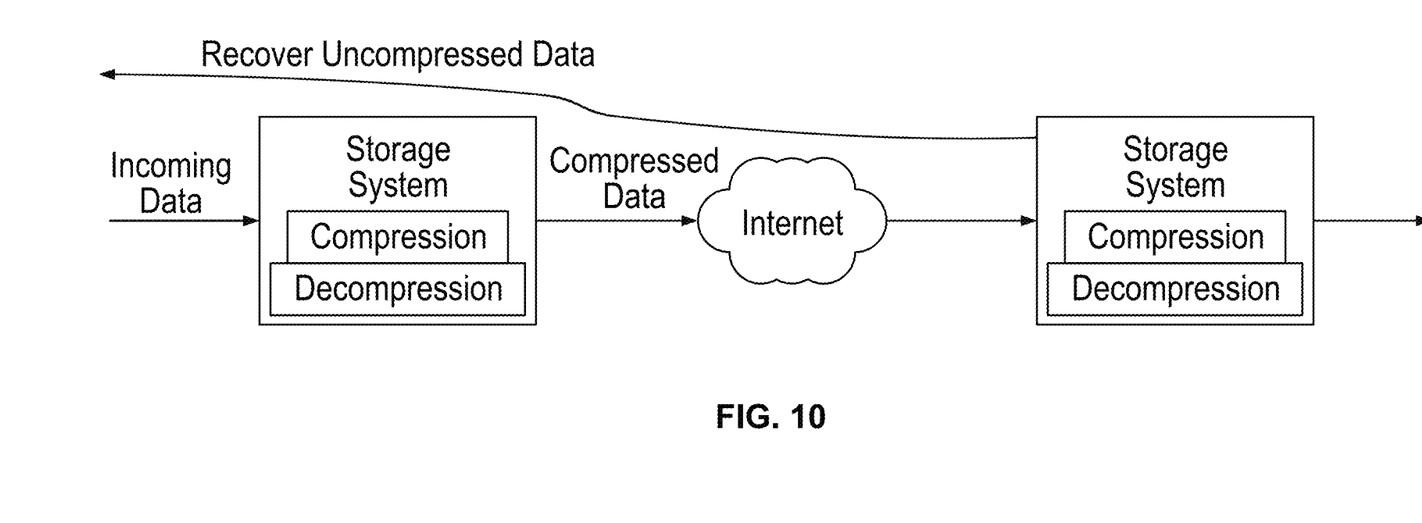
FIG. 10 illustrates an embodiment of an archival storage system with compression.

The compression techniques described herein may be employed in any storage tier (primary, secondary, backup and archival, for example). FIG. 10 illustrates an embodiment of an archival storage system with such a compression.

Hardware Accelerator

A hardware accelerator, sometimes called an Intellectual Property (IP) core, refers to special hardware support to implement a software algorithm. Hardware accelerators can achieve much higher performance and lower power consumption than running their algorithms on a general-purpose Central Processing Unit (CPU).

Ideal algorithms for hardware accelerators are simple and parallel, and require relatively small buffer or storage. The described techniques for compression may be implemented in hardware accelerators efficiently because each fragment requires a small data buffer (e.g., a few thousands of bytes), even though an image can be quite large (millions or billions of bytes).

A hardware accelerator may be designed to compress multiple fragments in parallel. Designers have the option to implement the coordination of the parallel compression of multiple fragments either in the accelerator or in software running on the main CPU.

Figure 11:
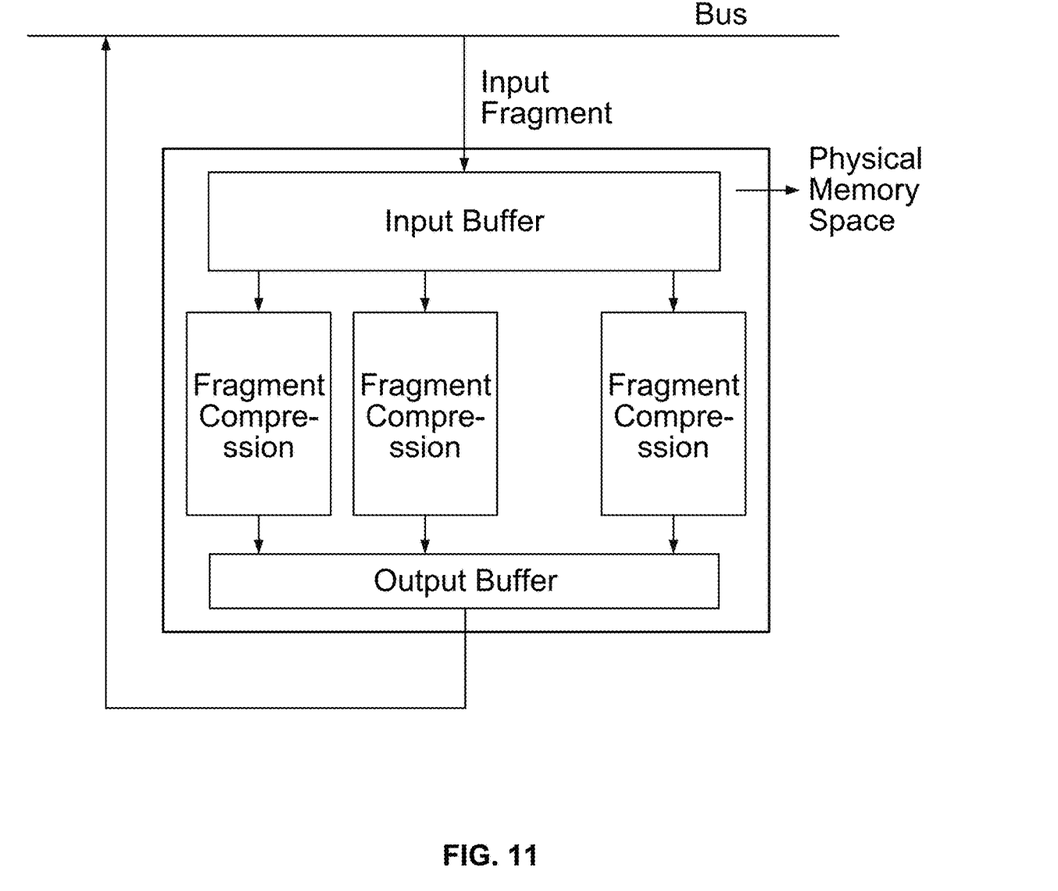
FIG. 11 illustrates an embodiment of the fragment compression algorithm implemented in hardware.

FIG. 11 illustrates an embodiment of the fragment compression algorithm implemented in hardware.

Media and Entertainment

In the media and entertainment industry, high-resolution cameras are used for capturing still and motion pictures. A common setup for much of the editing, production, and rendering software in this industry caches the individual frames (as many as several thousand in a workstation) from a store in which all frames are in individual files. Each frame is effectively considered as a still image and can be processed as such. One trend in video capture is high definition capture. The delivery is not necessarily the same as the acquisition format, but the idea is to capture as high a resolution as possible and to down-sample in post-production. Another trend for video capture is high frame rate.

When the acquisition format and frame rate are the best possible, it gives that much more freedom to edit as needed in post-production. Thus there is a need for cameras to support high resolution and high frame rate. By using raw sensor data output, data throughput and storage capacity of recording mediums can be limiting factors. Accordingly, there is a desire to output raw sensor data with reduced throughput. One solution is to use some form of lossless compression on the frames. The techniques for compression described above lend themselves very well to satisfy all these requirements for lossless compression of the individual frames at high throughput, and the camera or chip maker can easily create chips with enough processing elements to handle very high data rates. For example, the compression algorithm may be implemented on a camera chip in a manner very similar to that depicted in FIG. 11.

The ability to post process image and video content efficiently is a very important feature for the media and entertainment industry. It is often the case that an image has to undergo local edits in the post processing phase. However, the entire image has to be uncompressed in order to perform these edits. But because the compression techniques described herein work on fragments of images, rather than the entire image, local editing is enabled without making global changes to the compressed data. Some applications for this feature are cropping of an image, highlighting a part of the image, picture within a picture and various other such effects. A further embodiment of the invention is to process an image in several repetitive steps exploiting the continuous nature of the data in more than one dimension thus improving the compression.

The techniques for compression described herein may also be used in a combination of applications. For example, a post-processing movie editing software system could compress images prior to sending them over a network for backup, and the backup device could decompress the images at a future time without the use of the original software.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive an input sequence of data comprising a first channel;
generate a second channel based at least in part on a transform of data of the first channel;
generate a compressed output by encoding the second channel with a variable length code adapted to statistics of the data elements of the second channel, wherein the compressed output is based on a selection of one or more thresholds according to data elements of the second channel, and the one or more thresholds are selected based at least in part on a distribution of values corresponding to the data elements of the second channel and a frequency of values corresponding to the data elements of the second channel; and
a memory that stores the compressed output.

2. The system of claim 1, wherein generating the second channel comprises performing a plurality of transforms including a differential transform.

3. The system of claim 1, wherein the transform on the data of the first channel reduces or eliminates a redundancy of the data of the first channel.

4. The system of claim 1, wherein the transform on the data of the first channel uses a continuity of data of the first channel.

5. The system of claim 1, wherein the transform on the data of the first channel exploits continuity properties within the first channel and wherein the second channel is more compressible than the first channel.

6. The system of claim 1, wherein the transform on the data of the first channel is selected based at least in part on a compressibility of data resulting from the transform.

7. The system of claim 1, wherein the input sequence is associated with a fragment of an image.

8. The system of claim 7, wherein the fragment is independently compressed and decompressed without reference to other fragments of the image.

9. The system of claim 7, wherein the transform of data of the first channel is a different transform, and the transform of the data of the first channel is applied for every pixel independently.

10. The system of claim 1, wherein the transform corresponds to a differential transform, and wherein first data elements of the second channel and the first channel are the same and wherein the remaining data elements of the second channel comprise differences between consecutive data elements of the first channel.

11. The system of claim 1, wherein the compressed output comprises a lossless compression of the input sequence.

12. The system of claim 1, wherein the selection of one or more thresholds are selected by performing a threshold selection process.

13. A method, comprising:
receiving, by one or more processors, an input sequence of data comprising a first channel;
generating, by one or more processors, a second channel based at least in part on a transform of data of the first channel;
generating, by one or more processors, a compressed output by encoding the second channel with a variable length code adapted to statistics of the data elements of second channel, wherein the compressed output is based on a selection of one or more thresholds according to data elements of the second channel, and the one or more thresholds are selected based at least in part on a distribution of values corresponding to the data elements of the second channel and a frequency of values corresponding to the data elements of the second channel; and
storing the compressed output.

14. The method of claim 13, wherein generating the second channel comprises performing a plurality of transforms including the differential transform.

15. The method of claim 13, wherein the transform on the data of the first channel exploits continuity properties within the first channel and wherein the second channel is more compressible than the first channel.

16. The method of claim 13, wherein the transform on the data of the first channel is selected based at least in part on a compressibility of data resulting from the transform.

17. The method of claim 13, wherein the transform of data of the first channel is a different transform, and the transform of the data of the first channel is applied on a pixel-by-pixel basis.

18. A computer program product embodied in a non-transitory computer readable storage medium and comprising computer instructions for:
receiving an input sequence if data comprising a first channel;
generating a second channel based at least in part on a transform of data of the first channel;
generating a compressed output by encoding the second channel with a variable length code adapted to statistics of data elements of the second channel, wherein the compressed output is based at least in part on a selection of one or more thresholds according to the data elements of the second channel, and the one or more thresholds are selected based at least in part on a distribution of values corresponding to the data elements of the second channel and a frequency of values corresponding to the data elements of the second channel; and
storing the compressed output.

19. The system of claim 1, wherein the second data is better compressible than the first channel.

20. The system of claim 1, wherein the processor is further configured to select a transform with which the data of the first channel is to be transformed, wherein the transform is selected based at least in part on an estimation of a compressibility of a new channel obtained by transforming the first channel.

21. The system of claim 1,
wherein the one or more threshold are selected based at least in part on using at least a sequence of values corresponding to the second channel, a depth, and a frequency threshold.

22. A method, comprising
receiving, by one or more processors, an input sequence of data comprising a first channel;
generating, by one or more processors, a second channel based at least in part on a transform of data of the first channel;
generating, by one or more processors, a compressed output by encoding the second channel with a variable length code adapted to statistics of the data elements of second channel, wherein the compressed output is based on a selection of one or more thresholds according to data elements of the second channel, and the one or more thresholds are selected based at least in part on using at least a sequence of values corresponding to the second channel, a depth, and a frequency threshold; and storing, by one or more processors, the compressed output.

* * * * *

UNITED STATES PATENT AND TRADEMARK OFFICE
CERTIFICATE OF CORRECTION

PATENT NO. : 10,249,059 B2
APPLICATION NO. : 15/385725
DATED : April 2, 2019
INVENTOR(S) : Moses Charikar and Deepa Ramakrishna Page 1 of 1

It is certified that error appears in the above-identified patent and that said Letters Patent is hereby corrected as shown below:

In the Specification

In Column 2, Line 39, delete "MM images" and insert --MRI images--, therefor.

In Column 4, Line 40, delete "$X_i=A_ix$ or $A_{(i-1)}$ for $i>1$" and insert --$X_i=A_i$ xor $A_{(i-1)}$ for $i>1$--, therefor.

In Column 5, Line 17, delete "$[t_0, t_1), [t_1,t_2), [t_2,t_3),t_i,t_{i+1})$ . . . ." and insert --$[t_0, t_1), [t_1,t_2), [t_2,t_3)$ .... $t_i,t_{i+1})$ .....--, therefor.

In Column 5, Line 31, delete "$t_i,t_{i+1})$" and insert --$(t_i = k.2^b)$--, therefor.

Signed and Sealed this
Third Day of December, 2019

Andrei Iancu
*Director of the United States Patent and Trademark Office*